United States Patent [19]

Okada

[11] Patent Number: 5,740,531
[45] Date of Patent: Apr. 14, 1998

[54] DIGITAL MOBILE TELEPHONE COMMUNICATION METHOD, COMMUNICATION CHANNEL SWITCHING METHOD, AND MOBILE STATION AND BASE STATION FOR IMPLEMENTING SAME METHODS

[75] Inventor: Yasushi Okada, Kawasaki, Japan

[73] Assignee: Fujitsu Limited, Kanagawa, Japan

[21] Appl. No.: 499,769

[22] Filed: Jul. 7, 1995

[30] Foreign Application Priority Data

Oct. 27, 1994 [JP] Japan .................. 6-263826

[51] Int. Cl.⁶ ................................... H04Q 5/14
[52] U.S. Cl. .................. 455/403; 455/422; 455/553; 370/528; 370/522
[58] Field of Search .................. 379/57, 58, 59, 379/63; 455/33.1, 68, 403, 432, 561, 550, 552, 422, 423, 553, 466; 370/522, 528, 493, 494, 495, 352, 353

[56] References Cited

U.S. PATENT DOCUMENTS

| | | | |
|---|---|---|---|
| 4,271,499 | 6/1981 | Leveque | 370/94 |
| 4,528,659 | 7/1985 | Jones, Jr. | 370/528 |
| 4,813,040 | 3/1989 | Futato | 370/477 |
| 5,121,385 | 6/1992 | Tominaga et al. | 370/80 |
| 5,341,397 | 8/1994 | Gudmundson | 455/68 |
| 5,507,006 | 4/1996 | Knight | 379/59 |
| 5,513,183 | 4/1996 | Kay et al. | 455/33.1 |
| 5,612,955 | 3/1997 | Fernandes et al. | 370/528 |

FOREIGN PATENT DOCUMENTS

| | | |
|---|---|---|
| 0 465 443 | 1/1992 | European Pat. Off. |
| 0 526 436 | 2/1993 | European Pat. Off. |
| 0 544 101 | 6/1993 | European Pat. Off. |
| 0 566 957 | 10/1993 | European Pat. Off. |
| 0 599 664 | 6/1994 | European Pat. Off. |
| 123543 | 6/1994 | Japan . |
| 1043477 | 9/1966 | United Kingdom . |
| 2257332 | 1/1993 | United Kingdom . |
| 2 266 030 | 10/1993 | United Kingdom . |
| 2 290 198 | 12/1995 | United Kingdom . |
| 91/02436 | 2/1991 | WIPO . |
| 93/26100 | 12/1993 | WIPO . |

Primary Examiner—Dwayne Bost
Assistant Examiner—Keith Ferguson
Attorney, Agent, or Firm—Helfgott & Karas, P.C.

[57] ABSTRACT

Data signals such as a pseudo noise pattern and character data are transmitted along with voice signals over one voice signal channel, thereby allowing an accurate measurement of communication channel quality during communication or enabling concurrent transmission of both voice and character information over one communication channel. At the transmitting end, a silence interval is detected by a voice detector, and a selector is controlled so that a PN pattern, with a start signal and an end signal appended at the start and end thereof, is substituted in the silence interval. At the receiving end, the start signal and end signal are detected by a silence notification frame detector, and a selector is controlled so that background noise is substituted in the intervening period.

22 Claims, 9 Drawing Sheets

DIGITAL MOBILE TELEPHONE COMMUNICATION METHOD, COMMUNICATION CHANNEL SWITCHING METHOD, AND MOBILE STATION AND BASE STATION FOR IMPLEMENTING SAME METHODS

BACKGROUND OF THE INVENTION

1. Field of the Invention

The present invention relates to a digital mobile telephone communication method in which voice is digitized for radio communication between a mobile station and a base station, a communication channel switching method used in the same, and a mobile station and a base station for implementing these methods.

2. Description of the Related Art

The quality of a communication channel between a digital mobile telephone terminal and base station equipment is measured by inserting a pseudo noise (PN) pattern into the communication channel (which carries communication data when in use). However, insertion of a PN pattern into a communication channel is permitted only while the channel is not in use for actual service. When the communication channel is in use, the channel quality can be evaluated only by an error rate detection method using a CRC error check code or a fixed pattern of several bits.

Communication channel switching during communication usually takes place when the mean value of the current reception level drops below a certain value or when the signal level from a base station in an adjacent area becomes greater than the current signal level. A decrease in the received signal level, however, does not necessarily mean a drop in channel communication quality, and in a poor radiowave environment, even when the channel quality is good, unnecessary communication channel switching often occurs, causing unnecessary operations in switching equipment, etc.

Furthermore, in the prior art, for transmission and reception of character information concurrently with voice signals two separate channels have to be provided regardless of the transmission rate of the character information. This has often resulted in low channel utilization.

SUMMARY OF THE INVENTION

Accordingly, it is an object of the invention to provide a mobile telephone communication method that can transmit data signals, such as PN pattern and character data, along with voice signals, over one voice signal channel thereby allowing an accurate measurement of communication channel quality during communication or enabling concurrent transmission of both voice and character information over one communication channel.

It is another object of the invention to provide a communication channel switching method based on the measurement of communication channel quality during communication.

It is a further object of the invention to provide a mobile station and a base station for implementing the above methods.

According to the present invention, there is provided a digital mobile telephone communication method for transmission and reception of digitized voice signals between a mobile station and a base station, comprising the steps of: at the transmitting end, detecting a silence interval in the voice signals to be transmitted to the receiving end; at the transmitting end, inserting in the silence interval a data signal in place of a digitized voice signal; at the receiving end, detecting the data signal; and inserting in place of the data signal the digitized voice signal corresponding to the silence interval.

According to the present invention, there is also provided a communication channel switching method in digital mobile telephone communications for transmission and reception of digitized voice signals between a mobile station and a base station, comprising the steps of: at the mobile station, evaluating channel quality; comparing a reception level from the serving base station with a reception level from a base station in an adjacent area; when the reception level from the base station in the adjacent area is greater than the reception level from the serving base station, judging whether the evaluated channel quality satisfies a required condition; and if it is judged that the channel quality does not satisfy the required condition, deciding that channel switching be performed.

According to the present invention, there is also provided a mobile station for digital mobile telephone communications for transmission and reception of digitized voice signals to and from a base station, comprising: a data signal detector for detecting a data signal inserted at the base station and contained in a received signal received from the base station; and a silence signal inserter for inserting in place of the detected data signal a digitized voice signal corresponding to a silence interval.

According to the present invention, there is also provided a base station for digital mobile telephone communications for transmission and reception of digitized voice signals to and from a mobile station, comprising: a silence interval detector for detecting a digitized voice signal corresponding to a silence interval included in the digitized voice signals to be transmitted to the mobile station; and a data signal inserter for inserting a data signal in place of the digitized voice signal corresponding to the silence interval.

By transmitting a data signal such as a pattern signal or character data, an accurate measurement of communication channel quality is possible during communication, and unnecessary channel switching can be prevented. Also, voice information and character information can be transmitted simultaneously over one communication channel.

DESCRIPTION OF THE PREFERRED EMBODIMENTS

Figure 1:
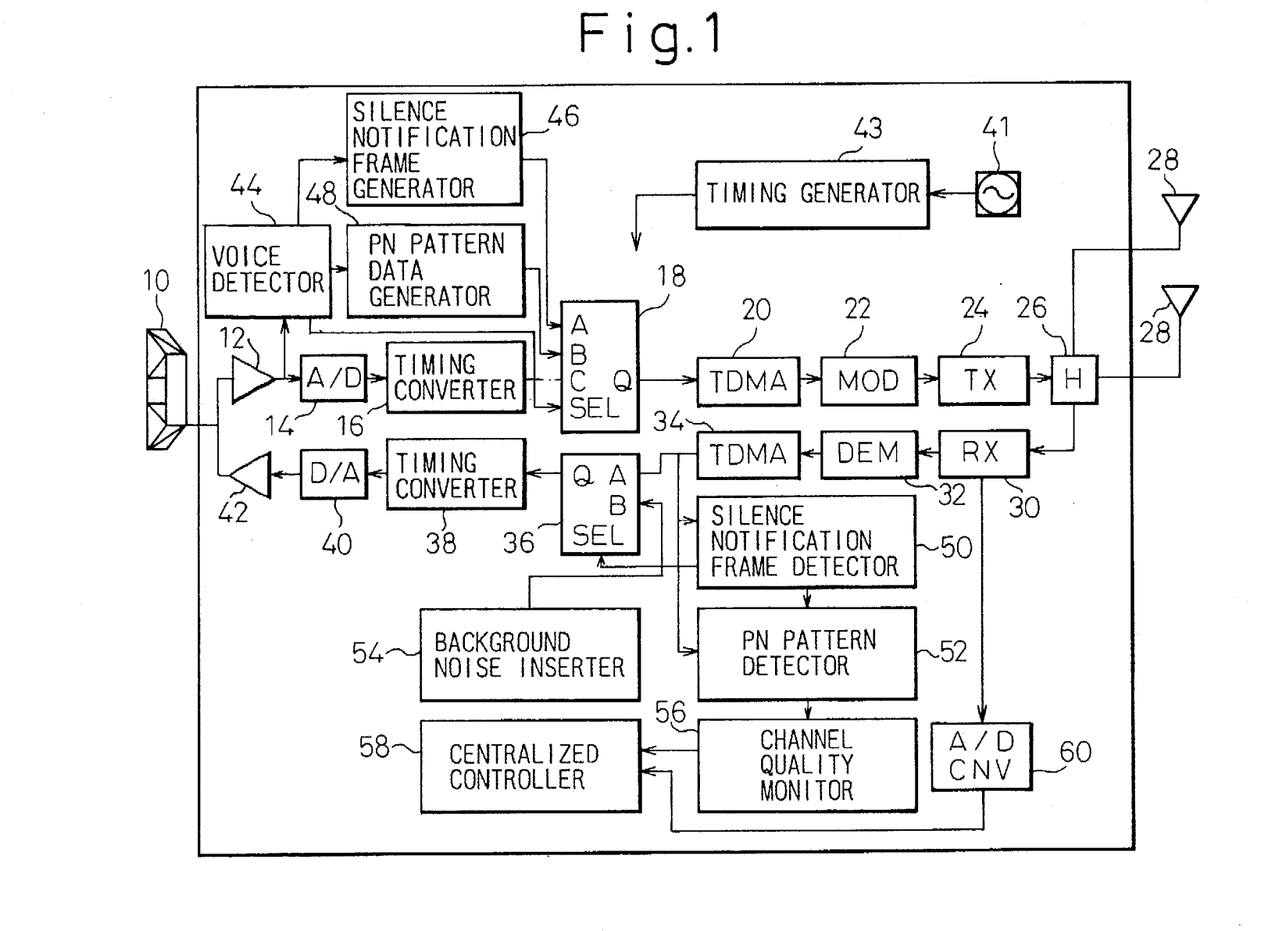
FIG. 1 is a block diagram of a mobile unit according to a first embodiment of the present invention.

FIG. 1 is a block diagram showing the configuration of a mobile unit according to a first embodiment of the present invention. The mobile unit shown in FIG. 1 inserts a pseudo noise (PN) pattern in a voice signal for transmission on an outgoing channel to a base station, to measure the communication quality of the outgoing channel, and extracts a PN pattern, inserted at the base station in a voice signal for transmission on a channel to the mobile station, to test the incoming channel from the base station.

First, circuit blocks for implementing the basic functions of a mobile unit for digital mobile telephone communication will be described. In FIG. 1, the voice signal picked up by a transceiver 10 is amplified by an amplifier 12, and converted by an A/D converter 14 into a digital signal. The digital signal is output from the A/D converter 14 in a repetitive form at a voice sampling rate-(for example, at intervals of 125 μsec), and the timing is changed by a timing converter 16 to generate bursts at intervals of 5 msec, for example, to match the format of time-division multiple access (TDMA). The output of the timing converter 16 is directed through a selector 18 to a TDMA section 20 where prescribed header, etc. are appended to form TDMA bursts. The TDMA bursts output from the TDMA section 20 are passed through a modulator 22, a transmitter 24, a hybrid 26, and are radiated from an antenna 28. Two antennas 28 are provided for space-diversity reception. Signals from the base station, received by the antennas 28, are passed through the hybrid 26 and directed through a receiver 30 and a demodulator 32 and on to a TDMA section 34. The TDMA section 34 extracts from the received bursts only the bursts that fall within the time slot assigned to the mobile unit, and outputs the extracted bursts with headers removed. The output of the TDMA section 34 is fed to a timing converter 38. The timing converter 38 changes the signal timing to convert the burst digital voice signal into a digital voice signal with discrete intervals by reversing the process performed in the timing converter 16. The output of the timing converter 38 is converted by a D/A converter 40 into an analog signal which is fed to the transceiver 10 via an amplifier 42. A timing generator 43 generates a timing signal necessary for the operation of each circuit block, based on the output of an oscillator 41 which is synchronized to the timing signal contained in the signals received from the base station.

A voice detector 44 detects a silence interval between voice signals from the output of the amplifier 12, and controls the selector 18 to select, during the silence interval, the outputs of a silence notification frame generator 46 and PN pattern data generator 48 rather than the output of the timing converter 16. The silence notification frame generator 46 outputs a silence notification frame consisting of a start signal and an end signal which are respectively appended at the head and tail of PN pattern data output from the PN pattern data generator 48.

A silence notification frame detector 50 recognizes the start and end of PN pattern data by detecting a start signal and an end signal from a burst signal output from the TDMA section 34, and controls a PN pattern detector 52 to detect a bit error in the received PN pattern data, and a selector 36 to select background noise from a background noise inserter 54 or a digitized voice signal corresponding to a silence state rather than the PN pattern data output from the TDMA section 34. A channel quality monitor 56 computes a bit error rate (BER) by counting the number of error bits detected by the PN pattern detector 52, and notifies a centralized controller 58. The centralized controller 58 comprises a CPU, and makes a decision as to whether communication channel switching be performed, as will be described later, based on the BER value notified from the channel quality monitor 56 and on the value of the received signal level output from the receiver 30 and converted by an A/D converter 60 into a digital value.

Figure 2:
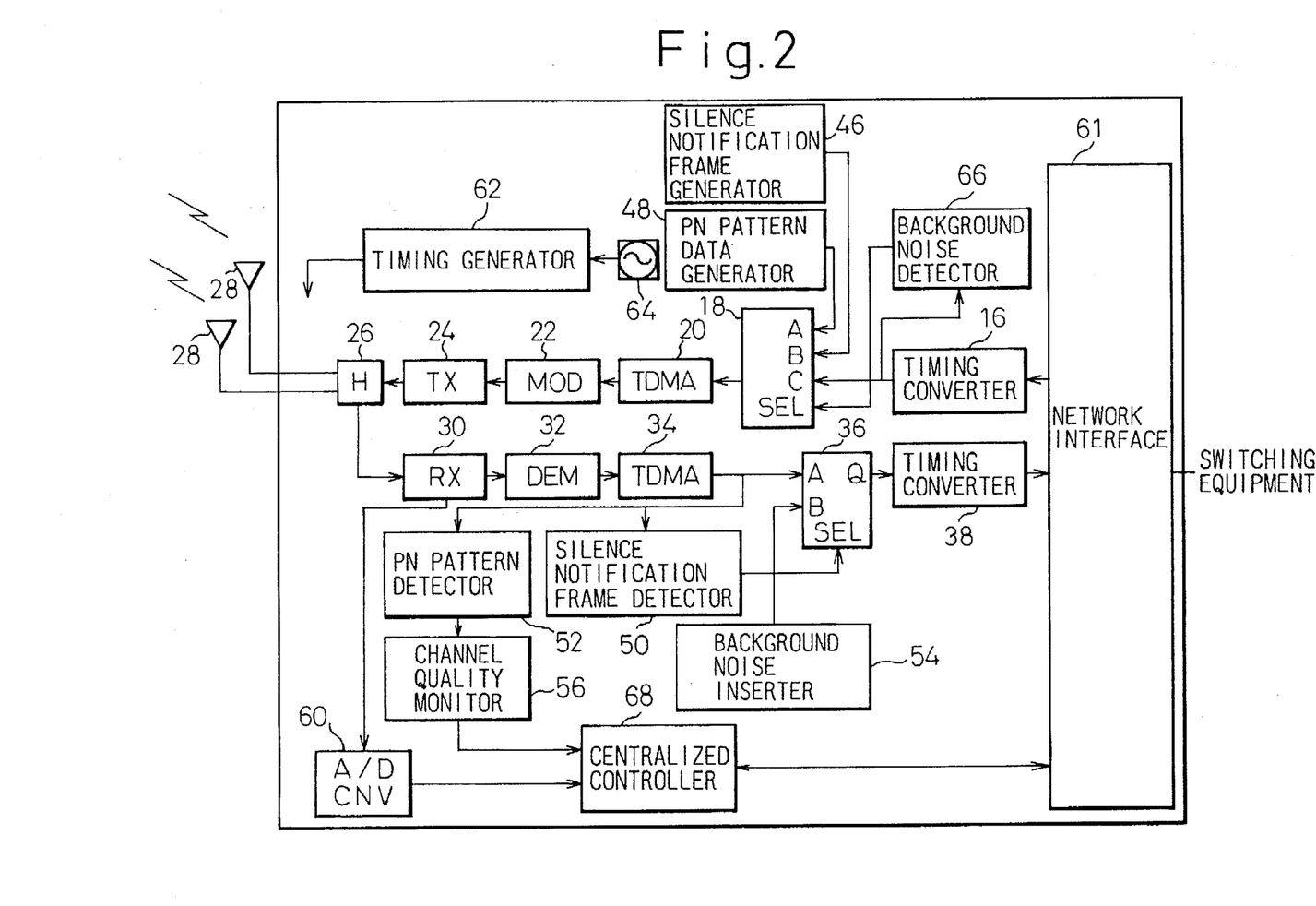
FIG. 2 is a block diagram of a base station according to the first embodiment of the present invention.

FIG. 2 is a block diagram showing the configuration of a base station used in conjunction with the mobile unit of FIG. 1, according to the first embodiment of the invention. The same components as those of the mobile unit shown in FIG. 1 are designated by like reference numerals, and explanation of such components will not be repeated here.

A network interface 61 is used to interface the base station to a public network, etc. The network interface 61 transfers a digitized voice signal, received from a public network, etc., to the timing converter 16, and also transmits the digitized voice signal from the timing converter 38 out to the public network, etc. A timing generator 62 generates a timing signal necessary for the operation of each circuit block, based on the output of an oscillator 64 which is synchronized to the timing signal from the public network, etc.

A background noise detector 66 detects a silence interval by detecting the digitized voice signal corresponding to the background noise or the silence state from the bursts output from the timing converter 16 and, as with the voice detector 44 in FIG. 1, controls the selector 18 to select during the silence interval the outputs of the silence notification frame generator 46 and PN pattern data generator 48 rather than the output of the timing generator 16.

A centralized controller 68 notifies the public network, etc., via the network interface 61, of the BER value of the outgoing channel, calculated and supplied by the channel quality monitor 56, and the value of the received signal level of the outgoing line, output from the A/D converter 60.

Figure 3:
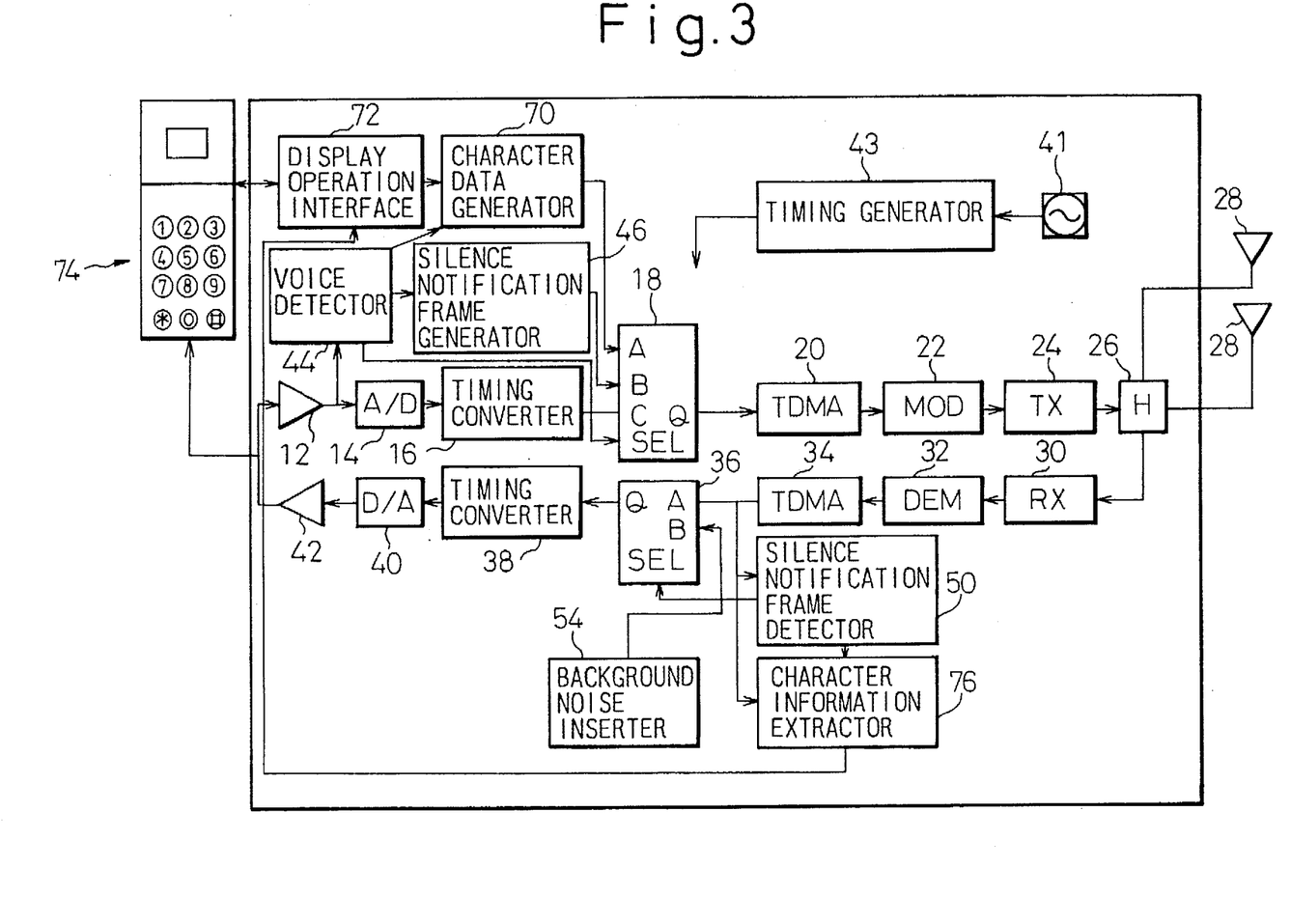
FIG. 3 is a block diagram of a mobile unit according to a second embodiment of the present invention.

FIG. 3 is a block diagram showing the configuration of a mobile unit according to a second embodiment of the invention. The same components as those of the mobile unit of FIG. 1 are designated by like reference numerals, and explanation of such components will not be repeated here.

In this embodiment, character data is inserted in a voice silence interval in order to increase channel utilization. A character data generator 70 receives via a display operation interface 72 the character data entered from a display operation section 74 on the mobile unit, and supplies the data to the selector 18 under the control of the voice detector 44. The voice signal in the silence interval is thus replaced by the character data having a silence notification frame appended to the start and end of it. A character information extractor 76, under the control of the silence notification frame detector 50, extracts character data for presentation on the display operation section 74 via the display operation interface 72.

Figure 4:
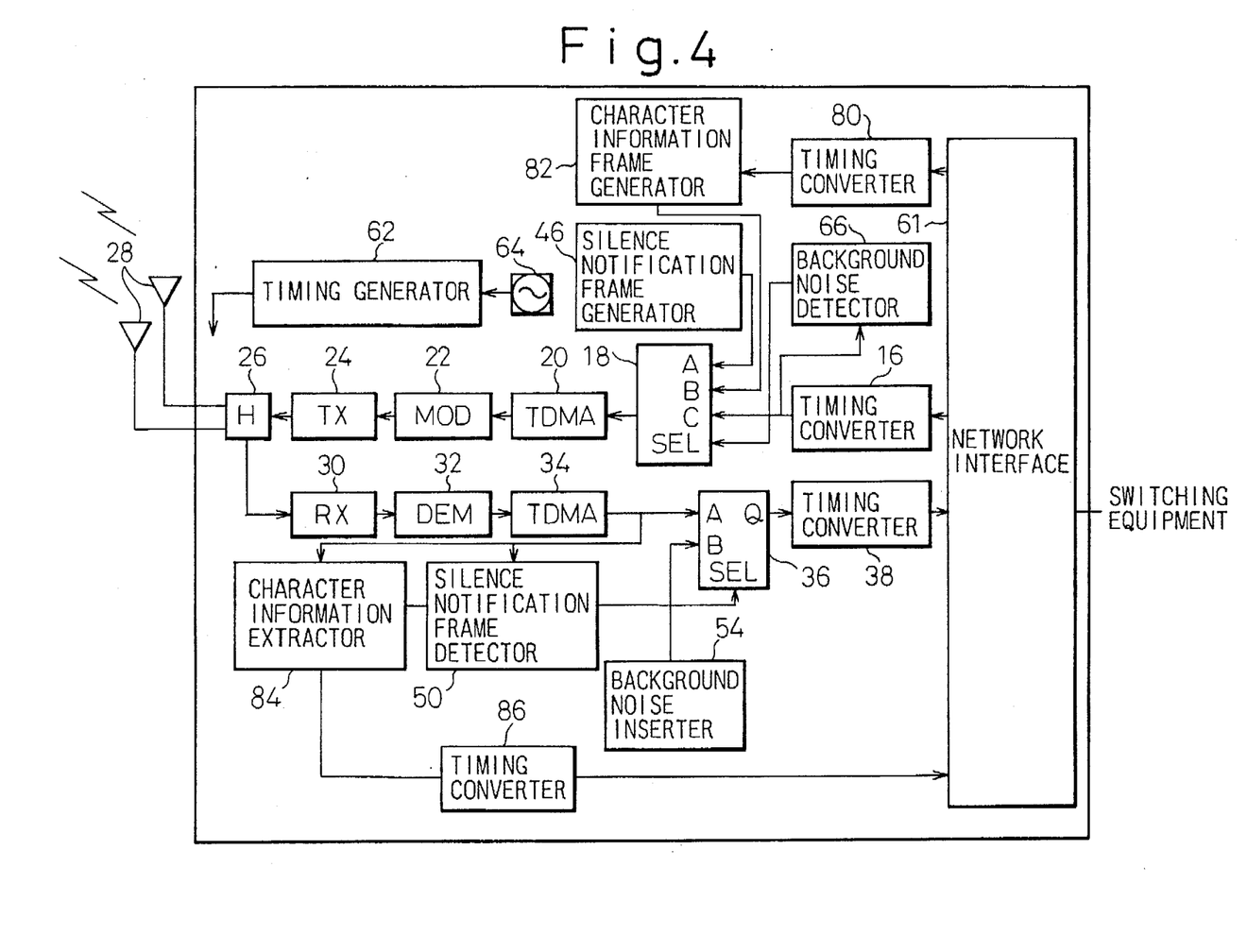
FIG. 4 is a block diagram of a base station according to the second embodiment of the present invention.

FIG. 4 is a block diagram showing the configuration of a base station used in conjunction with the mobile unit of FIG. 3, according to the second embodiment of the invention. The same components as those of the base station shown in FIG. 2 are designated by like reference numerals, and explanation of such components will not be repeated here.

A timing converter 80 converts the timing of character data transmitted from the network over a low-speed data channel to the timing of a burst signal. A character information frame generator 82 generates a character information frame from the character data that the timing converter 80 outputs, and supplies it to the selector 18 so that the character data is transmitted to the mobile unit during the silence interval. A character information extractor 84 extracts the character information inserted in the silence interval under the control of the silence notification frame detector 50. A timing converter 86 changes the timing of the character data output from the character information extractor 84 to match the timing of the low-speed data channel, and transfers the data to the network interface 61.

Figure 5:
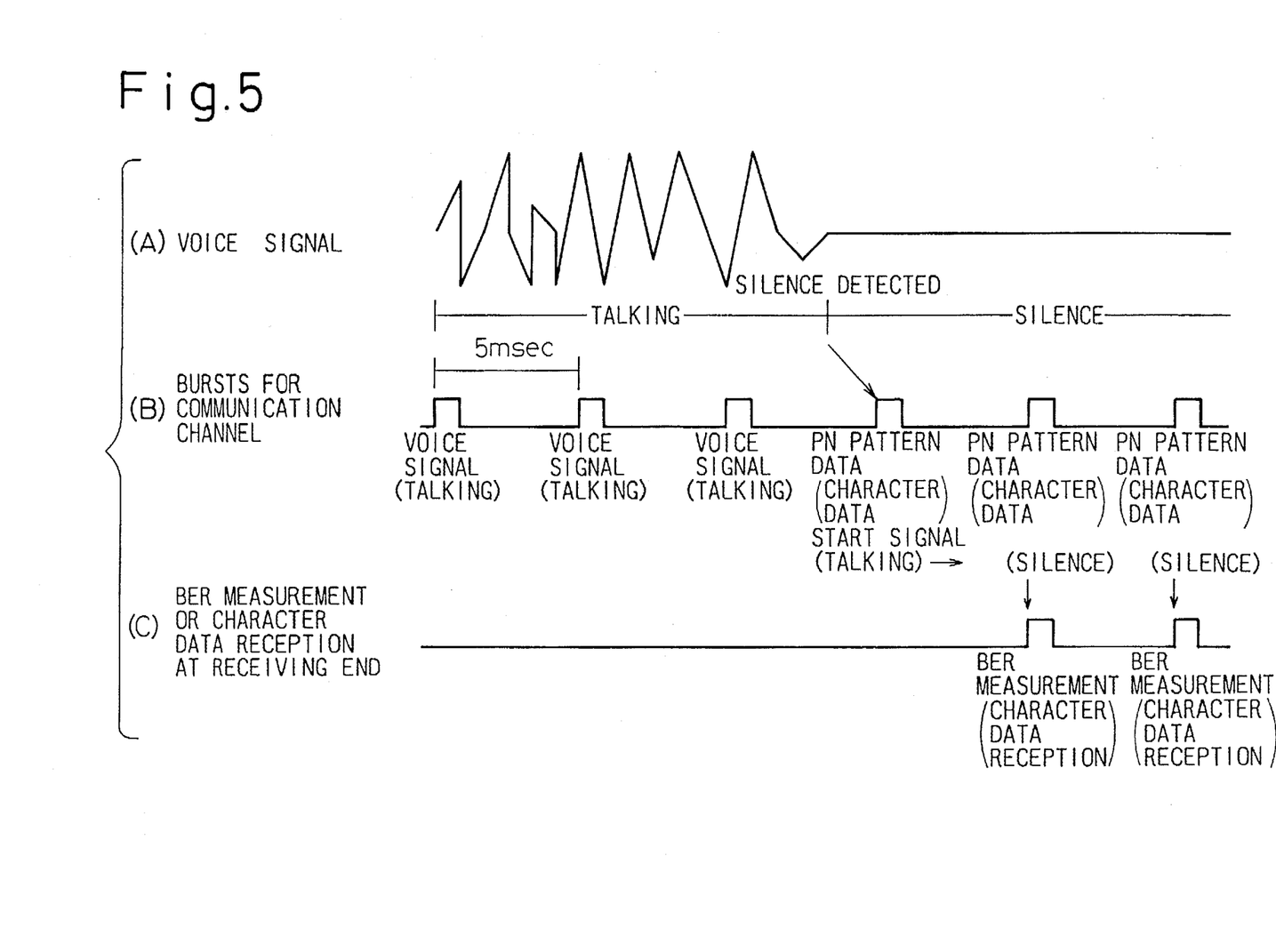
FIG. 5 is a timing chart illustrating the operation when a transition is made from a talking state to a silence state.

FIG. 5 is a timing chart illustrating the operation when the voice signal changes from a talking state to a silence state at the mobile unit and base station shown in FIGS. 1 to 4.

As long as the voice signal is present at the transmitting end as shown in FIG. 5(A), digitized voice signals are output at intervals of 5 msec from the selector 18 (FIGS. 1 to 4) as shown in FIG. 5(B), and transmitted as TDMA bursts to the receiving end. When the voice signal ceases and enters into a silence state, and the silence state is detected by the voice detector 44 (FIGS. 1, 3) or the background noise detector (FIGS. 2, 4), a PN pattern data (or character data) start signal containing the voice signal being output up to the detection of the silence state is output from the selector 18 in synchronism with the timing of the next burst, as shown in FIG. 5(B), and at each subsequent burst timing, PN pattern data (or character data) is output. When the silence notification frame detector 50 (FIGS. 1 to 4) at the receiving end has detected the start signal, BER measurement based on bit error detection or reception of the character data is initiated by the PN pattern detector 52 (FIGS. 1, 2) or the character information extractor 76 (FIGS. 3, 4), respectively, as shown in FIG. 5(C). During that period, the background noise output from the background noise inserter 54, or the digital data corresponding to the silence state, is selected by the selector 36 for output.

Figure 6:
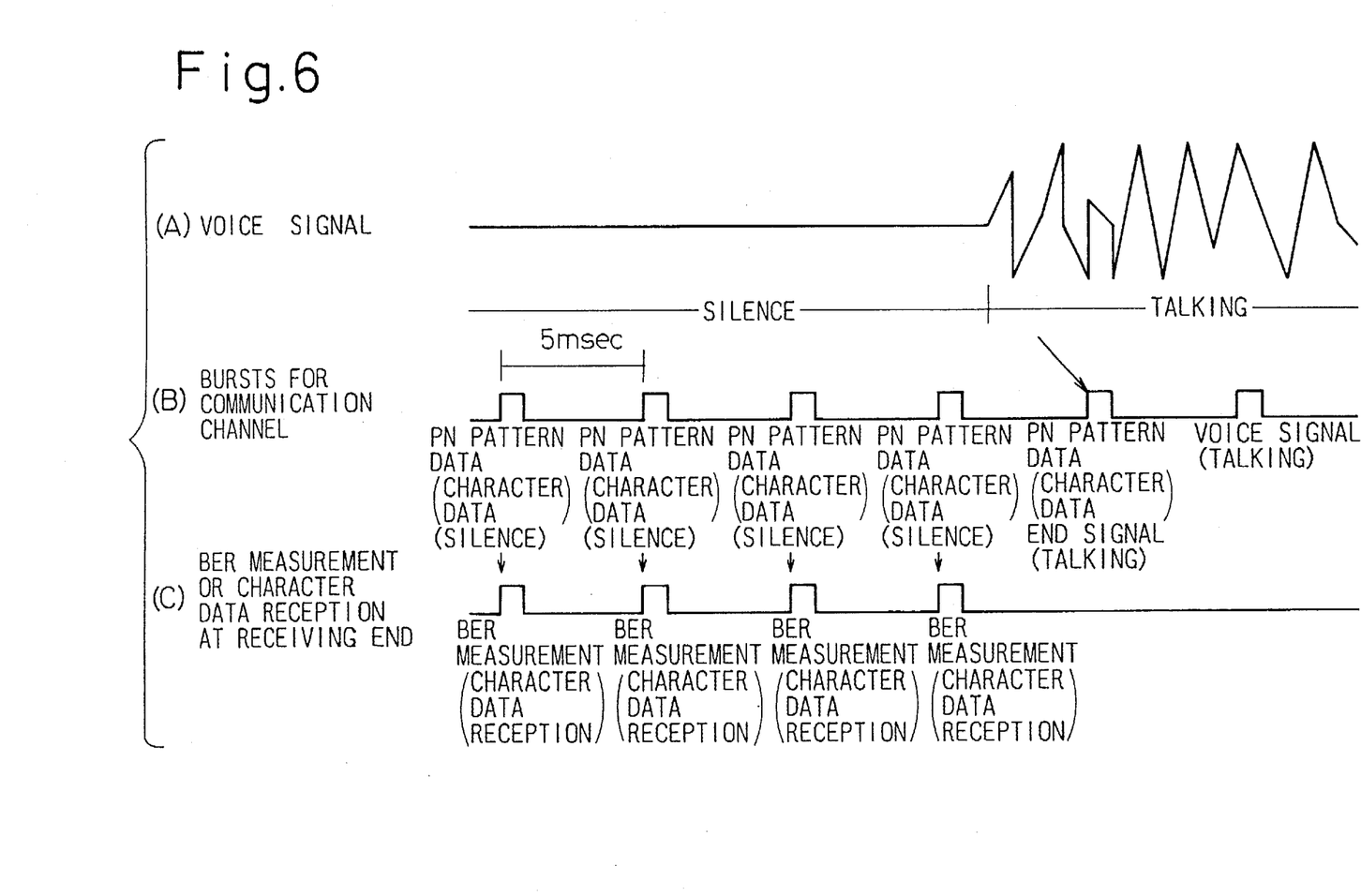
FIG. 6 is a timing chart illustrating the operation when a transition is made from a silence state to a talking state.

FIG. 6 is a timing chart illustrating the operation when a transition is made from a silence state to a talking state. When no voice is present as shown in FIG. 6(A), PN pattern data or character data is transmitted from the transmitting end as shown in FIG. 6(B), and BER measurement or character data reception is performed at the receiving end as shown in FIG. 6(C). When the voice detector 44 (FIGS. 1, 3) or the background noise detector 66 (FIGS. 2, 4) at the transmitting end detects the start of voice, an end signal containing the voice signal being output until that time is output from the selector 18 in synchronism with the timing of the next burst, and after that, voice signal bursts are output. When the silence notification frame detector 50 (FIGS. 1 to 4) at the receiving end has detected the end signal, the BER measurement or the character data reception is stopped, as shown in FIG. 6(C), and the received voice signal bursts are output from the selector 36.

Figure 7:
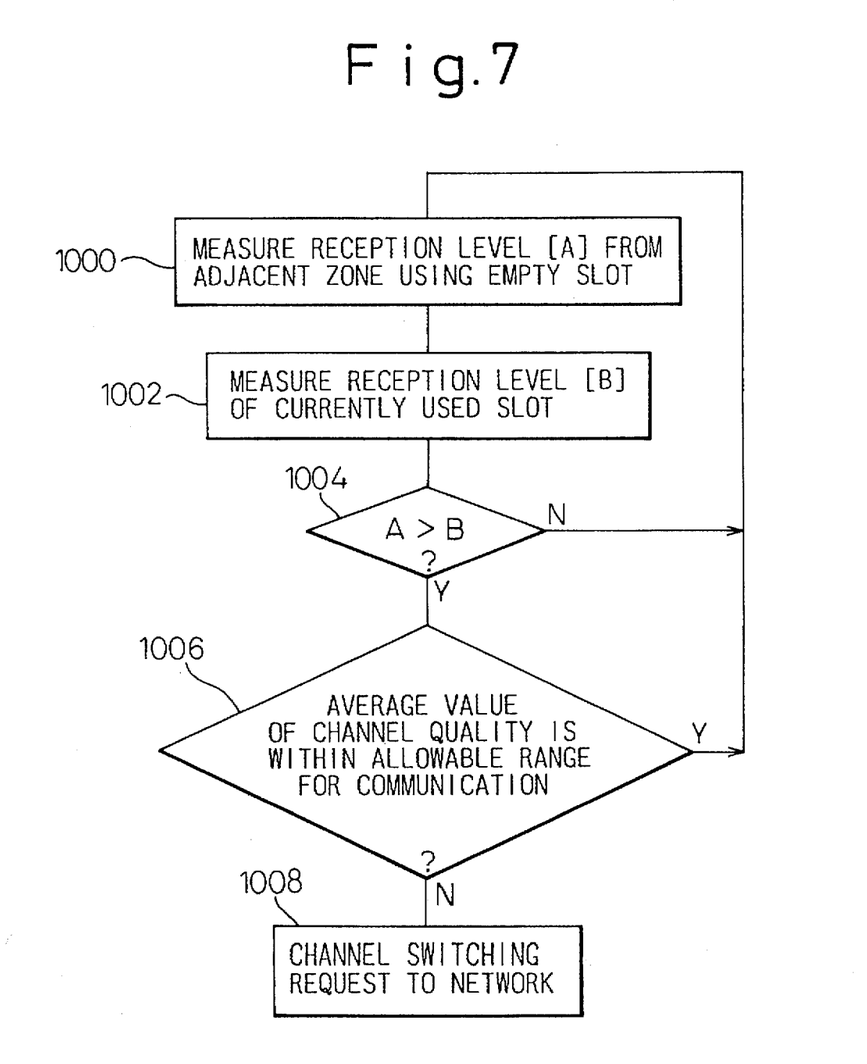
FIG. 7 is a flowchart illustrating a procedure for communication channel switching according to the present invention.

FIG. 7 is a flowchart illustrating the procedure for communication channel switching that the centralized controller 58 of FIG. 1 performs on the basis of the measured value of BER. In step 1000, reception level A from a base station in an adjacent zone, a different base station than the serving base station, is measured using an empty slot, and in step 1002, reception level B of the currently used slot is measured. If A is greater than B (step 1004), then it is judged whether the channel quality evaluated on the basis of the BER measured at the mobile unit as previously described is within an allowable range in terms of communication quality (step 1006). If the channel quality is at a satisfactory level despite A being greater than B, a request for communication channel switching is not issued and the process returns to step 1000. If the channel quality is outside the allowable range, then a request is made to the network for communication channel switching (step 1008).

Figure 8:
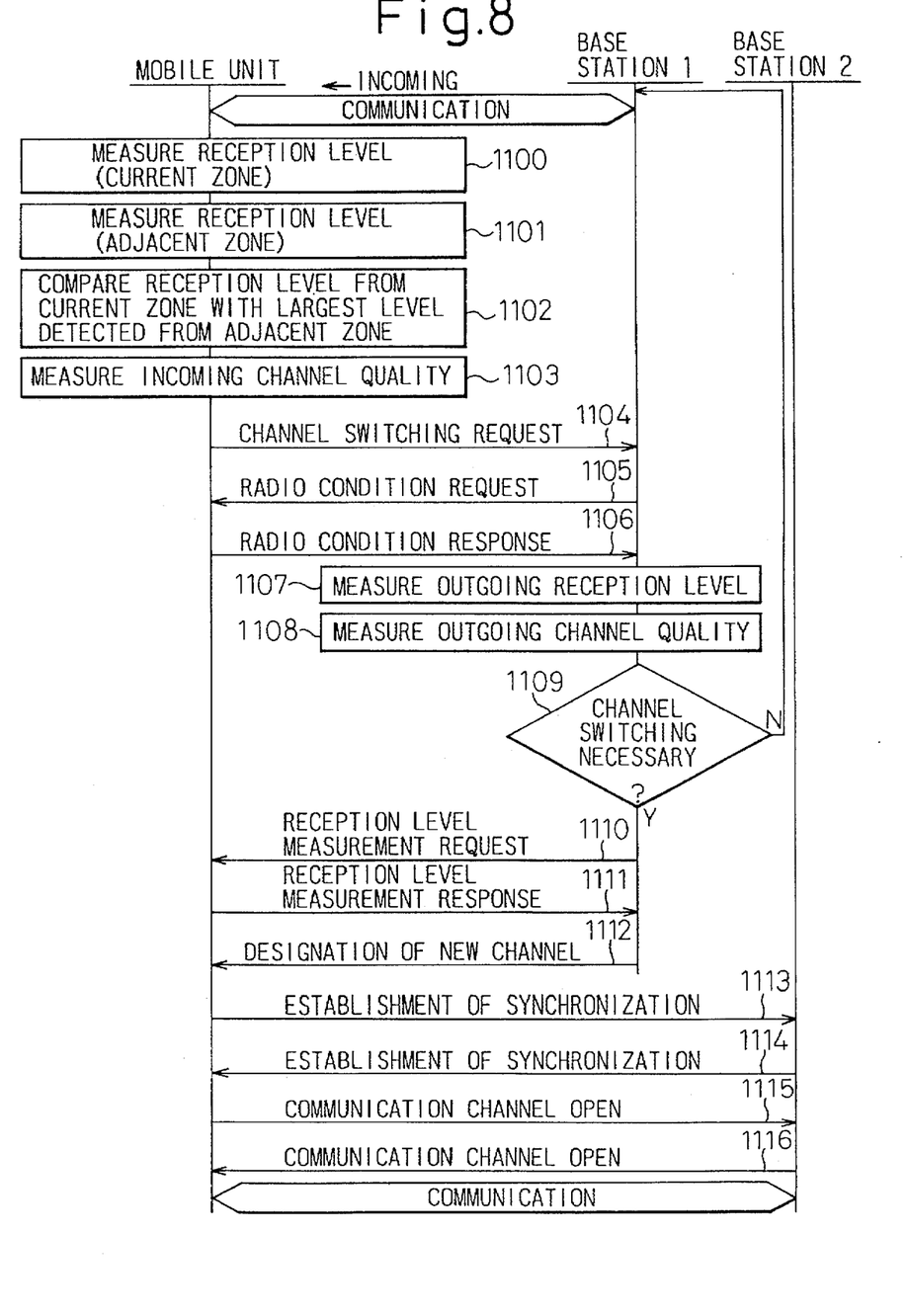
FIG. 8 is a diagram illustrating an actual channel switching operation.

An actual channel switching operation will be described with reference to FIG. 8. As described in FIG. 7, the mobile unit measures and compares the reception levels between the current zone and other zones, and monitors the communication quality of the incoming channel (steps 1100 to 1103). If it is decided that channel switching is necessary, a request for channel switching is sent to the base station (step 1104). The base station then transmits a radio condition request to the mobile station (step 1105) and, based on a radio condition response, obtains information on the current communication channel quality and the current reception level (step 1106). At the same time, the base station evaluates the reception level and communication quality of the outgoing channel (steps 1107, 1108), and makes a decision as to whether channel switching is necessary or not (step 1109).

If it is decided that channel switching is necessary, the base station sends a reception level measurement request (step 1110). Upon reception of the request, the mobile station measures the reception levels from the adjacent zones as well as the current zone over again, and notifies the base station of the reception levels from the current and adjacent zones as a reception level measurement response (step 1111). Based on the reception levels thus notified, the base station determines the channel to switch to and transmits this information to the mobile station (step 1112).

Upon reception of the information, the mobile unit establishes synchronization through the specified communication channel (step 1113), and when synchronization has been achieved with the base station (step 1114), synchronization of the communication channel is established. Further, the communication between the mobile station and the base station is established by transmission and reception of a communication channel open signal (steps 1115, 1116).

In this embodiment, detection of the channel quality and reception levels is performed at both the mobile station and the base station, but whether channel switching is necessary or not may be decided based on the detection at one or the other of the communicating stations.

In the prior art system, a request for channel switching was issued upon detection of the reception level from another base station becoming greater than the current reception level. On the other hand, according to the communication channel switching sequence of the present invention, as long as the current channel quality remains at a satisfactory level, the request for channel switching is not issued even when the reception level from another base station is greater than the current level. This prevents unnecessary operations of the switching equipment, etc.

Figure 9:
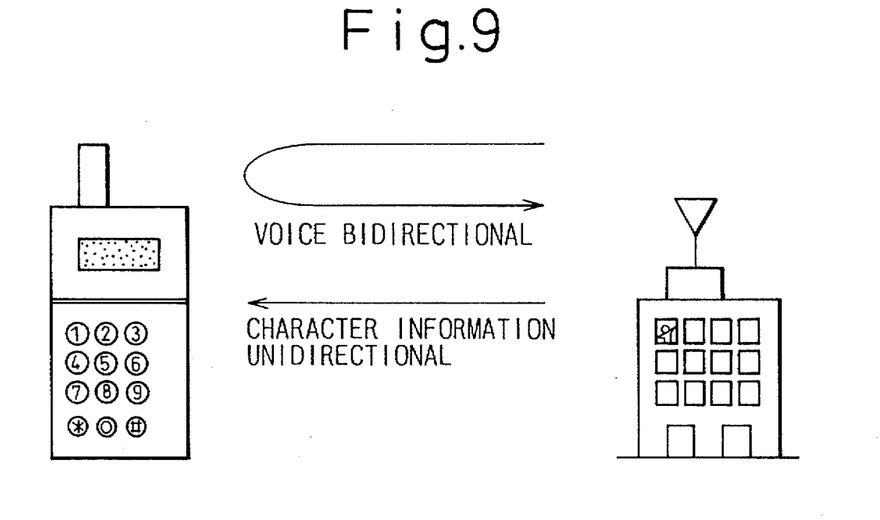
FIG. 9 is a diagram illustrating a unidirectional transmission of character data.
Figure 10:
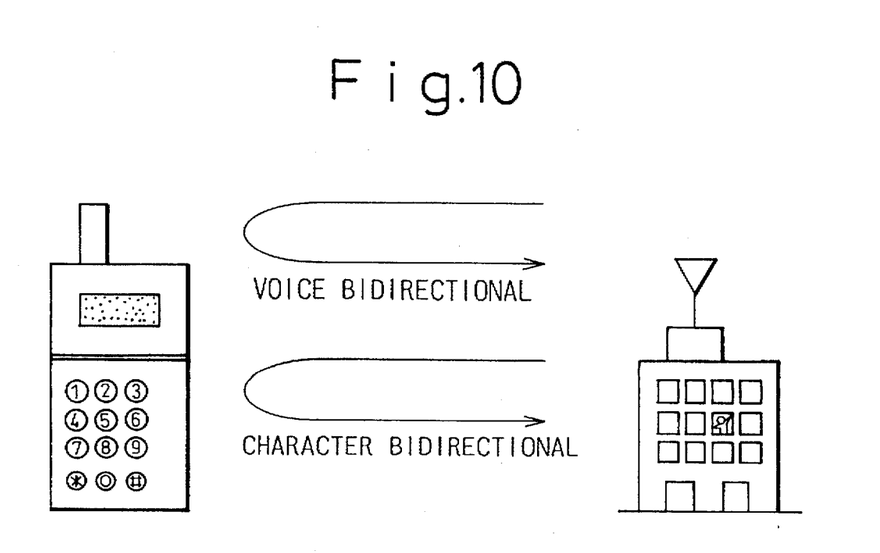
FIG. 10 is a diagram illustrating a bidirectional transmission of character data.

FIGS. 9 and 10 are diagrams illustrating how concurrent transmission of character data is performed during voice communication between the mobile station of FIG. 3 and the base station of FIG. 4. According to the invention, character data may be transmitted only in incoming direction as shown in FIG. 9 or in both directions as shown in FIG. 10.

As described above, according to the present invention, communication channel quality can be monitored in real time during communication in a digital mobile communication system. Furthermore, since the request for communication channel switching is issued based on the results of channel quality measurements, the invention has the effect of preventing unnecessary operations of the switching equipment, etc., while ensuring reliable channel assignments.

Moreover, by inserting character data in a communication channel, instead of P/N pattern data, voice and character data can be transmitted concurrently over a signal communication channel established through a radio link.

Thus the invention makes a substantial contribution to improvements in the reliability of the digital mobile communication system and also in data communication channel utilization.

I claim:

1. A digital mobile telephone communication method for transmission and reception of digitized voice signals between a mobile station and a base station, comprising the steps of:

a) at the transmitting end, detecting a silence interval in the voice signals to be transmitted to the receiving end;

b) at the transmitting end, inserting in said silence interval a data signal in place of a digitized voice signal;

c) at the receiving end, detecting said data signal; and d) inserting in place of said data signal the digitized voice signal corresponding to said silence interval.

2. A method according to claim 1, wherein said data signal includes a pattern signal for measuring channel quality, said method further comprising the step of e) evaluating channel quality based on said pattern signal included in the data signal detected in step c).

3. A method according to claim 2, wherein step a) includes detecting at the base station the digitized voice signal corresponding to said silence interval, said method further comprising the step of f) at the mobile station, determining whether to perform or not perform channel switching based on the channel quality evaluated in step e).

4. A method according to claim 3, wherein step f) includes the substeps of:

i) comparing a reception level from the serving base station with reception levels from other base stations in adjacent areas;

ii) when the reception level from any one of said other base stations is greater than the reception level from the serving base station, judging whether said evaluated channel quality satisfies a required condition; and iii) if it is judged in substep ii) that the channel quality does not satisfy the required condition, deciding that channel switching must be performed.

5. A method according to claim 2, wherein step a) includes detecting at the mobile station said silence interval in analog voice signals.

6. A method according to claim 1, wherein said data signal includes character data.

7. A method according to claim 6, wherein step a) includes detecting at the base station a digitized voice signal corresponding to said silence interval, said method further comprising the steps of:

e) extracting said character data included in the data signal detected in step c); and f) displaying characters corresponding to the extracted character data on a display of the mobile station.

8. A method according to claim 6, wherein step a) includes detecting at the mobile station said silence interval in analog voice signals, and the character data included in the data signal inserted in step b) is input from an input device of the mobile station.

9. A mobile station for digital mobile telephone communications for transmission and reception of digitized voice signals to and from a base station, comprising:

a data signal detector for detecting a data signal inserted at the base station and contained in a received signal received from the base station; and a silence signal inserter for inserting in place of said detected data signal a digitized voice signal corresponding to a silence interval.

10. A mobile station according to claim 9, wherein said data signal includes a pattern signal for measuring channel quality, further comprising a channel quality evaluator for evaluating channel quality based on said pattern signal included in the data signal and detected by said data signal detector.

11. A mobile station according to claim 10, further comprising a centralized controller for judging whether to perform or not perform channel switching based on the channel quality evaluated by said channel quality evaluator.

12. A mobile station according to claim 11, wherein said centralized controller includes:

means for comparing a reception level from the serving base station with reception levels from other base stations in adjacent areas;

means for, when the reception level from any one of said other base stations is greater than the reception level from the serving base station, judging whether the channel quality evaluated by said channel quality evaluator satisfies a required condition; and means for deciding that channel switching must be performed if the channel quality does not satisfy the required condition.

13. A mobile station according to claim 9, wherein said data signal includes character data inserted at the base station, further comprising:

a character data extractor for extracting the character data included in the data signal detected by said data signal detector; and a character display for displaying characters corresponding to the character data extracted by said character data extractor.

14. A mobile station according to claim 9, further comprising:

a voice detector for detecting a silence interval in analog voice signals; and a data signal inserter for inserting in said silence interval a data signal in place of the digitized voice signal.

15. A mobile station according to claim 14, wherein the data signal inserted by said data signal inserter includes a pattern signal for measuring channel quality.

16. A mobile station according to claim 14, wherein the data signal inserted by said data signal inserter includes character data input from an input device of the mobile station.

17. A base station for digital mobile telephone communications for transmission and reception of digitized voice signals to and from a mobile station, comprising:

a silence interval detector for detecting a digitized voice signal corresponding to a silence interval included in the digitized voice signals to be transmitted to the mobile station; and a data signal inserter for inserting a data signal in place of the digitized voice signal corresponding to said silence interval.

18. A base station according to claim 17, wherein the data signal inserted by said data signal inserter includes a pattern signal for measuring channel quality.

19. A base station according to claim 17, wherein the data signal inserted by said data signal inserter includes character data.

20. A base station according to claim 17, further comprising:
- a data signal detector for detecting a data signal inserted at the mobile station and contained in a received signal received from the mobile station; and
- a silence signal inserter for inserting in place of said detected data signal a digitized voice signal corresponding to a silence interval.

21. A base station according to claim 20, wherein said data signal includes a pattern signal for measuring channel quality, further comprising
- a channel quality evaluator for evaluating channel quality based on said pattern signal included in the data signal detected by said data signal detector.

22. A base station according to claim 20, wherein said data signal includes character data inserted at the base station.

* * * * *